United States Patent
Gabrielson et al.

(10) Patent No.: US 6,516,853 B1
(45) Date of Patent: Feb. 11, 2003

(54) APPARATUS AND METHOD FOR MANUFACTURING ELASTIC HAIR FASTENERS

(75) Inventors: Karl Gabrielson, Burlington, CT (US); James Serenson, Manchester, CT (US); Salvatore J. Shifrin, Windham, CT (US); Chris Sivo, Ellington, CT (US); Michael R. McKinley, East Hartford, CT (US); Richard F. Robinson, North Windham, CT (US)

(73) Assignee: Loctite Corporation, Rocky Hill, CT (US)

(*) Notice: Subject to any disclaimer, the term of this patent is extended or adjusted under 35 U.S.C. 154(b) by 8 days.

(21) Appl. No.: 09/774,344

(22) Filed: Jan. 31, 2001

Related U.S. Application Data

(60) Provisional application No. 60/179,578, filed on Feb. 1, 2000.

(51) Int. Cl.[7] .................. B65H 69/08; A65D 8/04
(52) U.S. Cl. ........................ 156/443; 132/275
(58) Field of Search ................ 132/200, 273, 132/275; 28/142; 156/137, 443, 481; 24/17 B

(56) References Cited

U.S. PATENT DOCUMENTS

| | | | |
|---|---|---|---|
| 3,099,271 A | * | 7/1963 | Dubelier ............... 132/273 |
| 3,780,679 A | * | 12/1973 | Hanes, Jr. et al. ........ 156/443 |
| 3,807,162 A | | 4/1974 | Tsujita et al. |
| 4,357,186 A | * | 11/1982 | Calvert ................. 156/443 |
| 4,519,857 A | * | 5/1985 | Clay ................... 156/443 |
| 4,552,365 A | * | 11/1985 | Smith .................. 273/425 |
| 4,822,448 A | * | 4/1989 | Thompson et al. ........ 154/443 |
| 5,066,743 A | | 11/1991 | Okamoto et al. |
| 5,156,171 A | | 10/1992 | Goodman |
| 5,288,794 A | | 2/1994 | Attarwala |
| 5,314,562 A | | 5/1994 | McDonnell et al. |
| 5,699,657 A | * | 12/1997 | Paulson ................. 57/22 |
| 5,730,161 A | | 3/1998 | Kohanek |
| 5,983,436 A | * | 11/1999 | Mason et al. ............ 15/222 |
| 6,047,708 A | * | 4/2000 | Panel et al. ............ 132/273 |

OTHER PUBLICATIONS

Loctite Corp.: Prism 401–Surface Insensitive General Purpose, E–Catalog, pp. 1–3, Jan., 2000.

* cited by examiner

*Primary Examiner*—Todd E. Manahan
(74) *Attorney, Agent, or Firm*—Hoffmann & Baron, LLP

(57) ABSTRACT

The present invention provides an improved method and apparatus for manufacturing elastic hair fasteners that eliminate the need for a metal clamp in the fastener assembly. The apparatus of the present invention that employs the inventive process is an incremental, automatic system that utilizes intricate mechanisms that are pneumatically actuated and controlled electrically. The machine feeds textile feedstock from a bulk supply along a feed track to a predefined staging position. Once the feedstock has reached this position, it is cut into an extension having a predetermined length and a pair of opposed free ends. The extension is rolled into a half circle, and one free end is positioned in a precise location. In this location, adhesive is applied to the free end, and the other half of the extension is thereafter rolled into a half circle, completing the loop. At this point, the two loop ends are positioned adjacent one another so as to be adhesively joined. Once joined precisely, a cold forming clamp is applied to the joined ends for a period of time necessary to fixture the assembly. After fixturing, the cold form clamp is released and a hot form clamp is applied for a period of time to shape the joint of the two ends into an aesthetically pleasing joint free of burrs and irregularities. Once formed, the assembly is complete and the loop is released into a bin for storage.

28 Claims, 4 Drawing Sheets

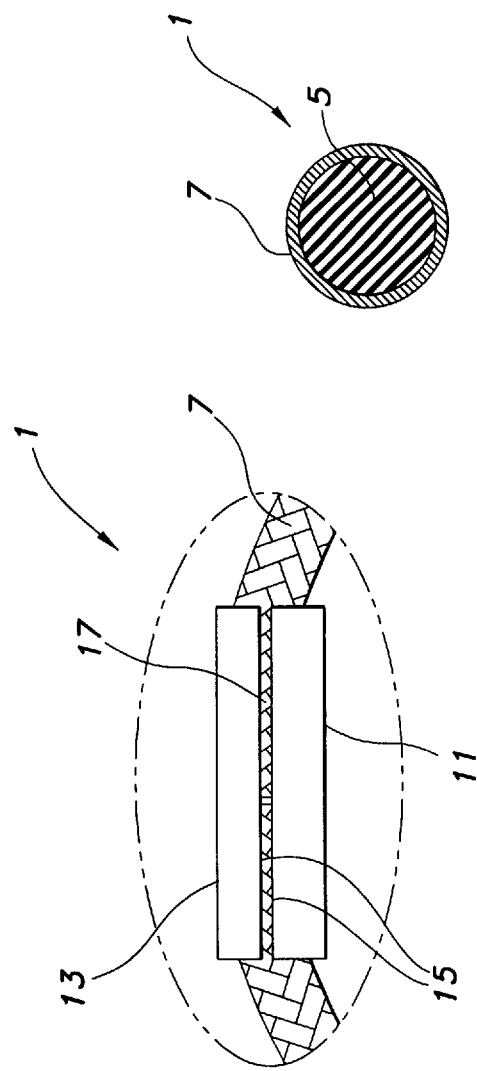
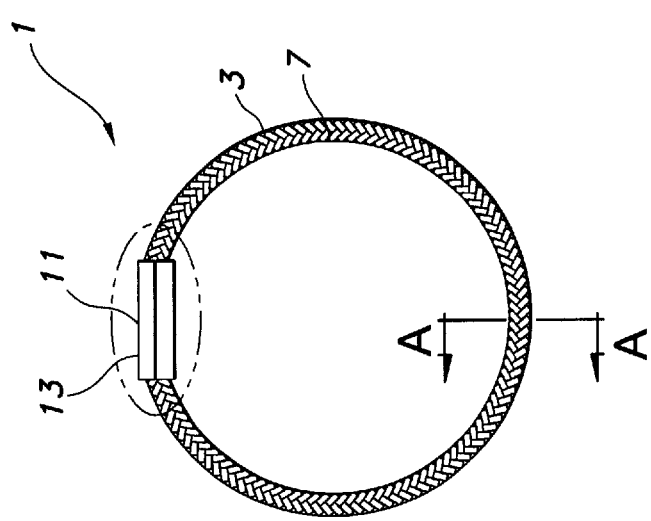
FIG. 1B (PRIOR ART)
FIG. 1A (PRIOR ART)
FIG. 1 (PRIOR ART)

APPARATUS AND METHOD FOR MANUFACTURING ELASTIC HAIR FASTENERS

This application claims priority to Provisional Application Serial No. 60/179,578 filed on Feb. 1, 2000.

FIELD OF THE INVENTION

This invention relates to a method and apparatus for improved manufacture of elastic hair fasteners. More particularly, this invention relates to a method and apparatus wherein opposed ends of an extension of textile feedstock are adhesively secured to one another without metal joints so as to improve both the performance and appearance of elastic hair fasteners assembled therefrom.

BACKGROUND OF RELATED TECHNOLOGY

It is well known for individuals to use expandable, elastic hair fasteners for securement and decoration of one or more sections of hair. People desire such fasteners to accomplish multiple functions, such as elevating hair to satisfy safety or hygiene concerns or restraining hair in order to achieve a desired cosmetic appearance. Since such fasteners are inexpensive and reusable for an extended duration of time, users often purchase the fasteners in multiples so as to produce hairstyles of both simple and complex variations with minimal cost and effort.

The basic operation of the fastener requires the user to use a conventional fastener to hold the hair in place, tying the fastener around a portion of hair at least once. Thus, elastic hair fasteners of this type can perform many desired functions by incorporation of a seemingly simple design. A conventional elastic hair fastener is shown in FIG. 1. Fastener 1 is generally a loop or lasso-shaped member formed from a predetermined length of textile feedstock such as braidstock 3. Braidstock 3 incorporates a core 5, made of rubber or similar elastomeric material, circumferentiallly sheathed by a continuous weave 7 of braided fibers or filaments (further shown in FIG. 1B). The relation of the core and filaments in the braidstock is such that the filaments are arranged so that the core is wrapped thereby and the covered core thus obtained and not easily separated from the sheath. The fibers are generally selected from the group of thermoplastic materials including polypropylene and nylon, such materials having smooth finishes upon weaving and demonstrating superior strength characteristics and flexibility with minimal cost.

Braidstock 3 is cut into an extension having a predetermined length defined by a pair of opposed free ends (not shown). Braidstock 3 is formed into a loop by joining these opposed ends to form a butt joint 11 thereby. As further shown in FIG. 1A, joint 11 is traditionally secured by a metal clamp 13 formed from a sheet of metal having opposed edges 15. Clamp 13 is circumferentially wrapped around an exterior surface of braidstock 3 so that edges 15 are adjacent one another so as to form a gap 17 therebetween. Clamp 13 provides additional securement of butt joint 11 therein so as to prevent disengagement of the hair fastener during use.

Although the metal clamp is well-suited for high-speed production, its incorporation into the hair fastener imposes a high cost on an otherwise inexpensive assembly. The metal clip further compromises the aesthetics of the hair fastener, because the tarnish of the metal stands out from the hair so as to draw attention to the elastic therewithin. In addition, such metal clamps are arranged circumferentially about the braid, leaving a gap between the ends thereof. This gap not only further deteriorates the appearance of the fastener, but also, more importantly, contributes to the discomfort of the wearer by pulling on the hair during adornment, removal and/or adjustment of the fastener therein. Hair that gets caught in the gap or between the metal clip and the braid gets damaged upon pulling of the fastener from the hair and creates enormous physical distress for the wearer.

In an attempt to obviate the problems inherent in conventional elastic hair fasteners as described hereinabove, a current method for assembling hair loops was developed wherein free ends of an extension of feedstock are manually adhered to one another. Other steps in the assembly process are likewise performed manually, such as holding the ends together manually until secure and manipulating the bond area manually until an acceptable aesthetic joint is realized. It is evident that such a method unnecessarily consumes resources of time, money and personnel, thereby eliminating the benefits realized by the fastener's cost effective design.

Since the manufacture of elastic hair fasteners is conducive to automation, and considering the savings of time and money associated therewith, it is desirable to provide a method of making elastic hair fasteners which eliminates the deleterious effects of metal clamps used as securement devices. It is further desirable to incorporate such a method into a manufacturing apparatus which retains the cost effectiveness of the hair fastener design while providing multiple hair fasteners having improved functional and aesthetic characteristics.

SUMMARY OF THE INVENTION

The present invention provides an improved method and apparatus for manufacturing elastic hair fasteners that eliminate the need for a metal clamp in the fastener assembly. The apparatus of the present invention that employs the inventive process is an incremental, automatic system that utilizes intricate mechanisms that are pneumatically actuated and controlled electrically. The apparatus feeds textile feedstock from a bulk supply along a feed track to a predefined staging position. Once the feedstock has reached this position, it is cut into an extension having a predetermined length and a pair of opposed free ends. The extension is rolled into a half circle, and one free end is positioned in a precise location. In this location, adhesive is applied to the free end, and the other half of the extension is thereafter rolled into a half circle, completing the loop. At this point, the two loop ends are positioned adjacent one another so as to be adhesively joined. Once joined precisely, a cold forming clamp is applied to the joined ends for a period of time necessary to fixture the assembly. After fixturing, the cold form clamp is released and a hot form clamp is applied for a period of time to shape the joint of the two ends into an aesthetically pleasing joint free of burrs and irregularities. Once formed, the assembly is complete and the loop is released into a bin for storage.

One advantage of the present invention is the elimination of metal clamps from elastic hair fastener assemblies. Elimination of the metal clamp from the manufacturing process reduces the costs associated with compiling the hair fastener assembly. Such cost reduction is desirable because the hair fastener itself is an inexpensive item, making it appealing to consumers for purchase in multiple quantities.

Another advantage of the present invention is to improve the function of the fastener by eliminating the metal clamp thereon. The production of a substantially smooth fastener without the sharp edges provided by metal clamps is desirable to avoid damage to hair caused by entanglement of the hair in such sharp edges. Distress to the wearer is avoided, thereby easing the effort required to don or remove the fastener.

Another advantage of the present invention is to improve the aesthetic quality of the fastener. Metal clamps used to secure feedstock ends often have a shiny, glossy or tarnished finish that stands out from the uniform color of the fastener and the color and texture of the hair within which it is used. The metal thereby detracts from the desired visual effect of the coiffure, instead drawing unwanted attention to the fastener when the wearer wishes to create an illusion that no assistance in the creation of the hair design was necessary.

Still another advantage of the present invention is the automated manufacture of elastic hair fasteners from a quantity of textile feedstock. Reductions in production time and expense are achieved by effecting sufficient securement of textile feedstock joints simply by application of an adhesive thereto.

A hair fastener assembly apparatus of the present invention was developed to adhesively join two opposed free ends of a length of textile feedstock. A machine takes and feeds straight feedstock, cuts the feedstock to a predetermined desired length extension, applies an adhesive to at least one free end thereof and fixes the free ends together to form a joint and resultant loop thereby. Each of a cold forming process and a hot forming process is executed on the joint so as to strengthen the joint and improve its aesthetic appearance. A cold forming step is required to fixture the loop ends, and a hot forming step is required thereafter to make the joint aesthetically pleasing.

BRIEF DESCRIPTION OF THE DRAWINGS

FIG. 1 shows a conventional braided elastic hair fastener having a metal clamp assembled therewith.

FIG. 1A shows an exploded view of a metal clamp of a conventional braided elastic hair fastener of FIG. 1.

FIG. 1B shows a cross-section taken along line A—A of the conventional braided elastic hair fastener of FIG. 1.

DETAILED DESCRIPTION OF THE PREFERRED EMBODIMENTS

Figure 3:
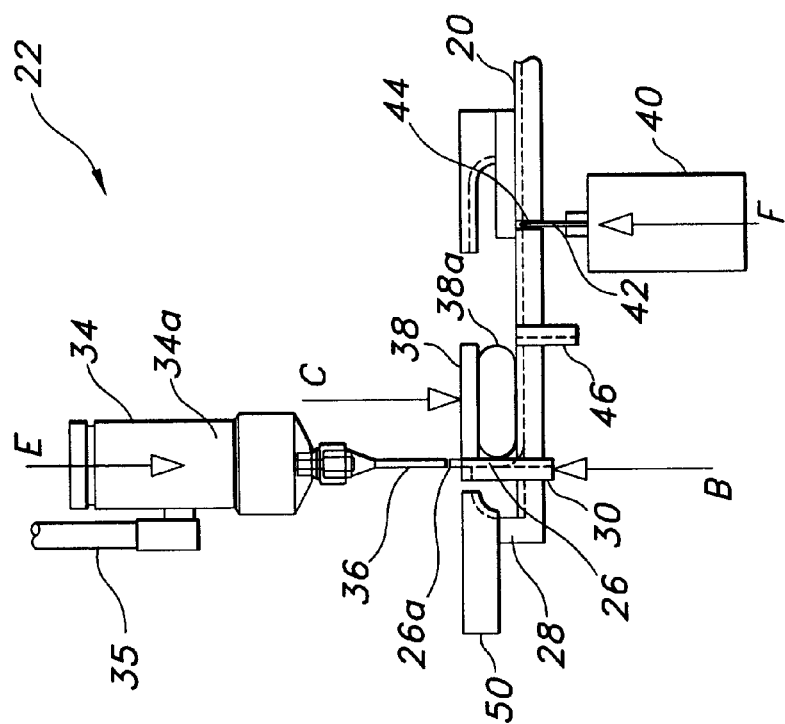
FIG. 3 shows a schematic view of the apparatus of FIG. 2 applying adhesive to a free end of feedstock while cutting the feedstock to an extension having a predetermined desired length.

In the present invention, at least one, but preferably a plurality, of elastic hair fasteners is manufactured according to a method in which adhesive replaces metal clamps in the securement of two opposed free ends of textile feedstock. In the present method, textile feedstock, which generally includes an elastomeric core having a circumferential sheath of polymeric fibers already disposed therearound, is fed into an assembly machine and cut into a plurality of extensions having a predetermined desired length. Each extension includes a pair of free ends at opposed extremities of the extension. A roll over tool is used to roll one of the ends so as to form a half-circle or half-loop from the extension. A pneumatically actuated dispenser deposits an amount of fast-curing adhesive on the rolled free end. A second roll over tool is actuated so as to roll the second end into alignment with the first end and complete the loop. The ends are brought into contact with one another so as to become adhesively secured to one another. A cold forming tool integrated into the machine is then used to perform a cold forming operation, thereby strengthening the joint formed between the two free ends. A hot forming tool performs a hot forming operation on the joint to produce an aesthetically pleasing joint, and the completed assembly is thereafter delivered to a storage bin.

Before processing the feedstock, several important factors must be considered regarding the feedstock design itself which have a large effect on the magnitude and consistency of the pull strengths achieved when using an adhesive assembly process. One important factor is the selection of fabric forming method that will be used to produce a textile sheath. Commonly used fabric forming methods include interlacing (i.e. weaving and braiding), interlooping (i.e. weft and warp knitting), bonding and tufting. As contemplated herein, the feedstock utilized in the present inventive process and apparatus utilizes a braid wherein two yarn systems are interlaced such that the paths of the yarns are diagonal to the fabric delivery direction, forming either a flat or tubular structure. Thus, other factors to consider include the number of filaments in the braid weave (normally 8, 16 or 32), the filament type and diameter, the filament denier, texture and shape (i.e., round, rectangular, etc.), the number of weaves, the density of the braid and the braid pattern.

Filament quality characteristics which are most important to achieve superior braids for use in a braided elastic hair fastener include short- and long-term weight uniformity, imperfections, weight variation, tensile properties, strength, lubricity and flexibility. Warp yarns closest to the edges of a fabric undergo more stress due to widthwise contraction of the fabric toward the center, causing linear angular displacement of these outermost yarns. The straightness of individual warp yarns and their freedom to act independently as they pass through a weaving machine are important to good weaving performance. Yarns that are crossed and tangled cannot proceed without excessive stress and yarns that are restricted will not weave at top performance. Attention to details in the yarn preparation processes and in the weaving process should yield good results, however, additional variables such as mean pull force, variation in the pull force, aesthetics in the assembly and ease of tacking down the braid fibers at the butt joint can also be evaluated to determine the optimum adhesive and braid material combination.

The core of feedstock material is preferably a conventional core rubber such as ethylene propylene diene monomer (EPDM). EPDM is a rubber that is capable of withstanding extensive temperature and moisture variations without cracking or deterioration. EPDM exhibits a high tensile strength, extreme elongation capabilities and can be exposed to numerous chemicals without any detrimental effect. The ethylene content of EPDM allows for highly predictable cure rates and physical properties achieved thereby, greatly reducing variability. EPDM cord stock will not exert a high amount of stress on the hair fastener joint in use.

Fasteners of the type contemplated herein are likely to be subjected to repeated application of heat from hair dryers, curlers and curling irons, hot blowers, diffusers and similar hair styling equipment. Similarly, the fasteners and the adhesively secured butt joints thereof will be exposed to various chemicals in the form of shampoos, conditioners, styling products (sprays, gels, mousses and the like), chlorine, perspiration, makeup and other environmental contaminants, to which the butt joints must remain resistant. The fastener will further be used for both short and long sections of hair of varying thickness, requiring superior strength and resiliency characteristics.

Feedstock for use with the present invention, therefore, desirably incorporates fibers made from synthetic thermoplastic filaments such as polypropylene and nylon. Polypropylene exhibits a combination of superior physical, chemical, mechanical and thermal properties that are important not only to the fabrication process but also to the long-term use of the resultant hair fastener. Polypropylene is a desirable material for fibers due to its light weight, superior working temperature and high tensile strength. Polypropylene is impact resistant and maintains a high compressive strength so as to retain stiffness and flex. It is a non-toxic material that is easily fabricated and therefore amenable to weaving in a variety of weave patterns. Polypropylene demonstrates excellent chemical resistance, which is desirable in hair fasteners due to the plethora of hair products, activities and environmental contaminants that the fastener will encounter while adorning the wearer's head. Moreover, polypropylene is resistant to staining and exhibits a low moisture absorption rate, assisting in the rapid transport of moisture away from the material and thus away from the fastener. It is also a tough and semi-rigid material that exhibits good heat resistance, excellent flexibility and a "living hinge" capability (meaning that in thin sections where the molecules are oriented, the material can be flexed almost indefinitely without failure). One of polypropylene's most important properties is its low price, which is due to a relatively simple synthesis from the low cost petrochemical propylene.

Another desired material for the fibers of the present invention is nylon. Nylon, like polypropylene, is a synthetic thermoplastic that can be woven in filament form. Nylon is stronger yet weighs less than any other commonly used fiber. It is elastic, resilient and responsive to heat settings, however, nylon fibers are also smooth, non-absorbent and dry quickly. Thus, dirt does not cling to the smooth fiber nor is the fiber weakened by chemicals and perspiration. Nylon melts at high temperatures and exhibits excellent toughness and fatigue properties as well as moisture, abrasion and chemical resistance. Nylon possesses good memory, and this ability to return to its original position after being deformed is a highly desirable characteristic for reusable fasteners. Nylon filaments in the feedstock offer higher pull strengths, even in assemblies where there is much less braid material available at the joint, making it easier to tack down the nylon frays at the butt joint to create an aesthetically pleasing interface. Any weave or filament design can be used in the present invention for either of nylon or polypropylene.

Although polypropylene and nylon are recognized herein as desirable fibers useful with the present invention, it is evident that any fiber suitable for the successful operation of the present invention apparatus and method may be used. Numerous other thermoplastic filaments can be utilized, including polyethylene and the like. The processability of a polymer, even in filament form, is highly dependent on its rheological properties, which have close relationship with its molecular weight, molecular weight distribution, temperature and shear rate. As a result, cure times may vary without affecting the overall operability of the apparatus or effectiveness of the disclosed method.

Selection of an appropriate adhesive is also important in the execution of the present inventive method. Selection of the proper adhesive is dependent upon numerous factors, such as the materials to be bonded, the end use of the adhered materials and the physical properties required thereby. In the automated environment contemplated herein, the adhesive solution must allow for very rapid processing (desirably 1 second cycle time), resist repeated stretching and must adhere to the filament weave around the outer diameter of the elastic core.

In the hair elastic assembly process of the present invention, it is desirable to utilize surface insensitive ethyl cyanoacrylate adhesives, although any adhesive capable of bonding the selected material may also be employed. An example of such a desired adhesive is Loctite Prism 401, a product of Loctite Corporation of Rocky Hill, Conn. (wherein Loctite is a registered trademark of Loctite Corporation.). Such adhesives are general purpose, low viscosity, fast curing adhesives that are specifically formulated for difficult to bond substrates such as polypropylene and nylon weaves. Cyanoacrylate adhesives are therefore well suited for high-speed production due to their rapid curing times. In addition, cyanoacrylates are generally clear colorless liquids, thereby improving the appearance of the bondline after cure. The bond that is typically achieved with such materials exceeds the industry strength specifications, eliminates the potential for damage to hair and lowers the raw material costs. Examples of useful cyanoacrylate adhesives are described in U.S. Pat. Nos. 5,066,743, 5,288,794 and 5,314,562, all of which are incorporated herein by reference. Other types of adhesives, such as anaerobics, silicones, epoxies, acrylics, hot melts and the like, may also be useful. It is understood that this illustration of useful adhesives is merely illustrative, and other adhesive compounds amenable to use in the present invention may also be employed.

Now referring to the figures, in which like elements are identically numbered, FIGS. 2–5 show a schematic representation of an adhesive assembly machine used herein incorporating the present inventive process.

Figure 2:
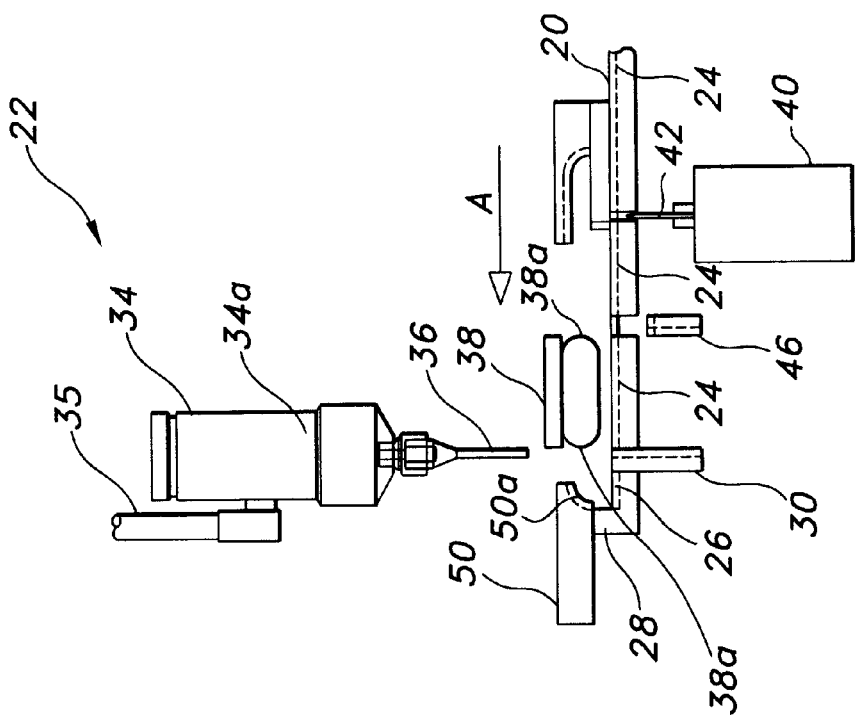
FIG. 2 shows a schematic view of a hair fastener assembly apparatus used to perform an adhesive assembly method of the present invention after feeding of textile feedstock thereinto.

An adhesive assembly process of the present invention is initiated by loading a quantity of feedstock 20 in the direction of arrow A into an adhesive assembly apparatus 22, described further hereinbelow. Adhesive assembly apparatus 22 includes plate-supported feed tracks 24, which feed tracks guide feedstock 20 from an initial loading position to a subsequent staging position as shown in FIG. 2. In the staging position, feedstock 20 overlays feed tracks 24 such that a free end 26 thereof lies adjacent a normally protruding stop 28.

After feedstock 20 reaches the predetermined staging position, a first reciprocating member 30 imparts upward motion in the direction of arrow B to free end 26 such that a face 26a thereof lies within a plane normal to the plane in which face 26 was originally positioned (see FIG. 3). Simultaneously, a platen 38 having rounded edges 38a moves in a direction of arrow C so as to create a curved portion in feedstock 20 and thereby begin formation of the fastener loop. Platen 38 is in parallel alignment with feed tracks 24 so as to sandwich feedstock 20 therebetween. Downward movement of platen 38 brings platen 38 in communication with feedstock 20 so as to maintain tension therein. Platen 38 keeps feedstock 20 in a straight configuration while reciprocating member 30 forces free end 26 upward.

Also at this time, a first roll over tool 50 is actuated so as to have horizontal reciprocating motion. Roll over tool 50 includes curvature 50a that corresponds to a rounded edge 38a of platen 38. Roll over tool 50 slides toward platen 38 in the direction of arrow D so as to envelop free end 26 therebetween. Free end 26 of feedstock 20 is bent so as to form a curve conforming to the shape of curvature 50a, further forming the loop configuration of the hair fastener assembly.

At this point, a pneumatically actuated adhesive dispenser 34 having an air cylinder 35 coupled therewith moves vertically downward in the direction of arrow E. Dispenser 34 includes a chamber 34a for retention of a flowable adhesive therein and an adhesive applicator 36 that regulates the flow of the adhesive therethrough and thereby releases the adhesive in a predetermined desired quantity onto a substrate. As reciprocating member 30 brings free end 26 in alignment with adjacent applicator 36, applicator 36 dispenses a predetermined desired quantity of adhesive on face 26a so as to wet the fibers present thereat. Such quantity is pre-selected according to the type of feedstock used.

As adhesive is applied to face 26a, a vertically reciprocating cutter element 40 supporting a cutting blade 42 thereupon moves vertically upward in the direction of arrow F through an aperture 44 in feed tracks 24 (see FIG. 3). Aperture 44 is located at a predetermined position so that blade 42 cuts feedstock 20 to form a feedstock extension 20' having a second free end 26' which defines a predetermined length of the extension. Feedstock 20 is desirably cut so that each of the pair of extension segments on either side of the butt joint is approximately the same length. Attention is given to cleanly cutting the feedstock to facilitate the assembly of the resultant hair fastener and to ensure that the length yields an abutting relationship of the free ends.

Figure 4:
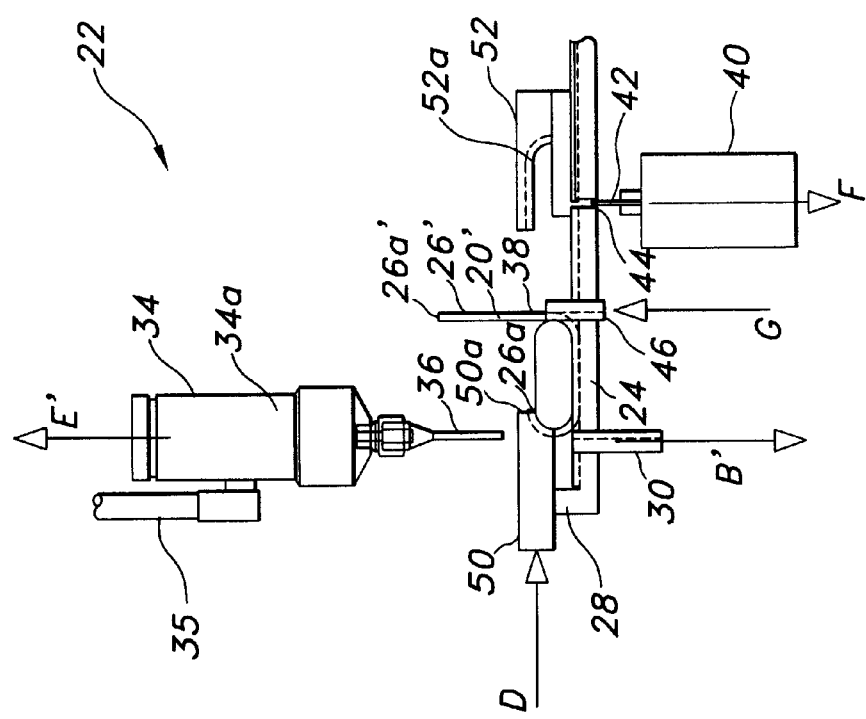
FIG. 4 shows a schematic view of the apparatus of FIG. 2 during roll over of a first free end of feedstock and manipulation of a newly cut second free end at an opposed extremity thereof.

Referring now to FIG. 4, a second reciprocating member 46 is thereafter actuated in a vertical reciprocating motion in the direction of arrow G so as to impart upward movement to free end 26' such that a face 26a' thereon faces dispenser 34. At this time, blade 42 is retracted from aperture 44, and reciprocating member 30 is likewise retracted in the direction of arrow B'.

Figure 5:
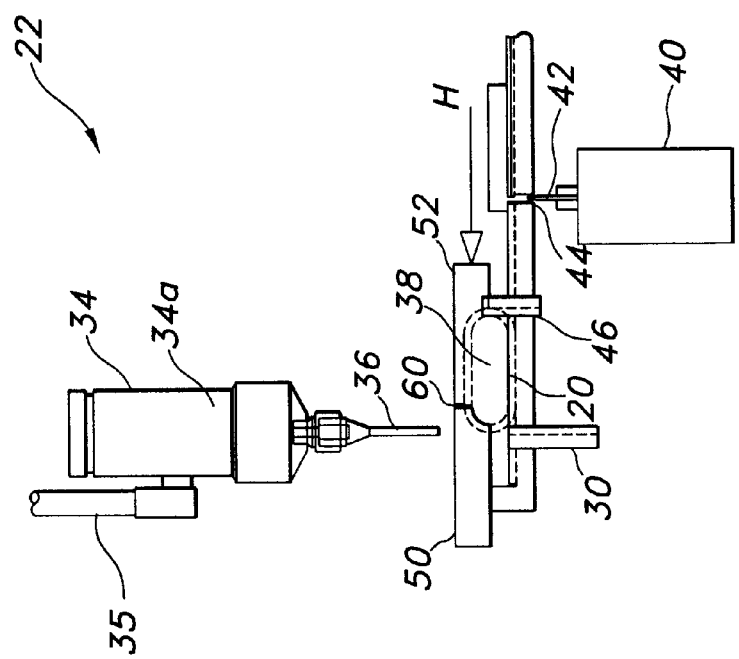
FIG. 5 shows a schematic view of the apparatus of FIG. 2 wherein an opposed free end of the feedstock is rolled and brought adjacent the first free end so that the ends are adheringly connected to one another so as to form a hair fastener loop thereby.

A second roll over tool 52 having reciprocating vertical motion is also provided in FIG. 5 that slides in a direction of arrow H. Roll over tool 52 also includes a curvature 52a defined on an interior surface thereof which corresponds to a rounded edge 38a of platen 38. Roll over tool 52 slides toward platen 38 from an opposing side thereof so as to sandwich free end 26' therebetween and complete the formation of a loop thereby. Each of reciprocating members 30 and 46 and each of cutting tool 40 and roll over tools 50 and 52 can be pneumatically actuated or otherwise directed by programmable logic controller, PC based controller or other means of executing machine logic.

It is evident that once roll over tool completes its migration with respect to feedstock 20, free end 26 is in communication with free end 26' and the flowable adhesive so as to be adheringly connected thereto, forming a butt joint 60 thereat. During this step, it is desirable to bond the fibers at joint 60 together and attain proper alignment thereat to achieve acceptable performance characteristics as defined hereinabove.

In a post assembly operation, joint 60 undergoes a cold forming operation (i.e. cold clamping) such as that performed by a pair of clamping jaws. The cold form of the joint forces the adhesive to be evenly distributed and ensures proper alignment thereat. The advantages of cold forming include improvement of joint strength without the application of heat, which is important to achieving aesthetically pleasing parts with acceptable strengths. The anticipated cold forming time ranges from 3–6 seconds when using cyanoacrylate adhesives.

After completion of the cold forming process, a hot forming process is executed on joint 60 so as to soften the material thereat, such as that performed with a pair of clamping jaws having heat applied thereto. The hot form accelerates the cure of the adhesive, spreads out adhesive and cleans up the joint aesthetics. The hot form cycle typically ranges from about 250° F. to about 400° F. and occurs for a duration of about 1 to 3 seconds. Each of the hot and cold forming processes is desirably carried out on assembly apparatus 22 so that the entire process is executed on a single piece of machinery. The newly created elastic hair fastener assemblies are thereafter unloaded from the apparatus and distributed a storage unit for further disposition.

Figure 7:
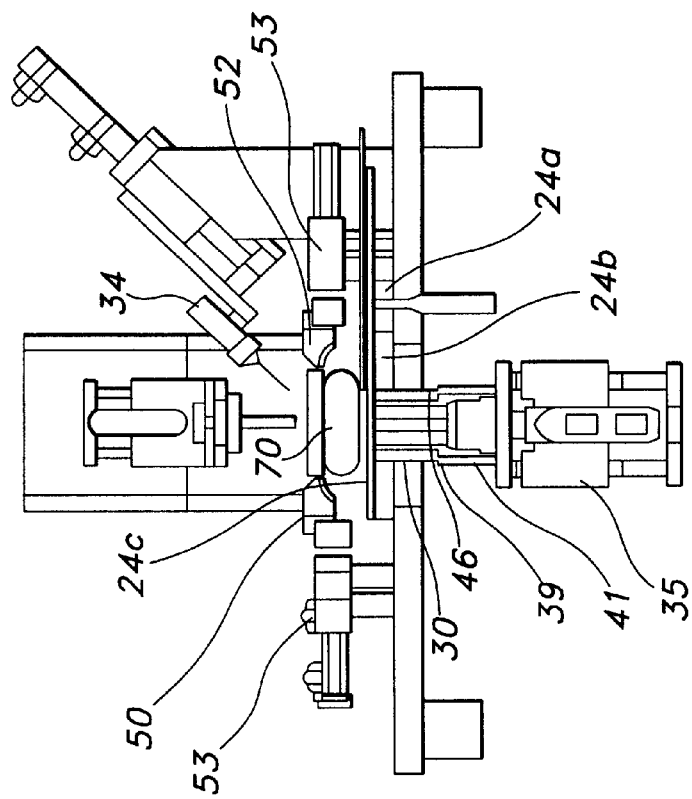
FIG. 7 shows an alternate perspective view of the hair fastener assembly apparatus of FIG. 6.
Figure 6:
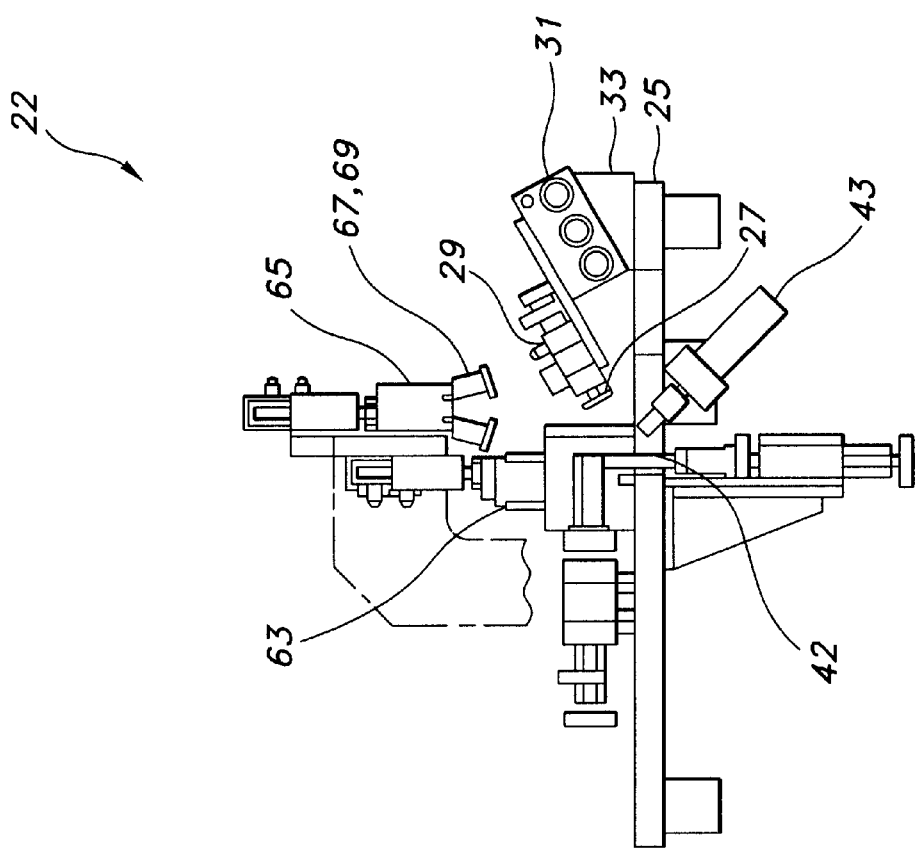
FIG. 6 shows a perspective view of a preferred embodiment of a hair fastener assembly apparatus of the present invention.

Now referring to FIGS. 6 and 7, a preferred embodiment of assembly apparatus 22 of the present invention is illustrated. Assembly apparatus can include a series of several independent heads that share a common machine base and control system. Each head will perform all functions to assemble a single loop, yielding the maximum "up time" of the machine. Any head on the machine can be shut down without affecting the assembly of loops by the other heads. Although each head on the machine is preferably designed to accept a large diameter braid, additional machines can be designed to accommodate other diameters using the principles described herein.

An elongate piece of feedstock (not shown) is loaded in assembly apparatus 22 via a feed track having sections 24a (first section), 24b (second section) and 24c (third section) supported upon a base plate 25. The feedstock is fed along the feed track until a free end thereof reaches an initial loading position at which a rake 27 is mounted upon a mounting block 29. Rake 27 slidingly advances inward at an angle (desirably at approximately 45°) along a slide 31 supported by a slide support 33. Rake 27 provides a plurality of teeth thereon which engage the feedstock and impart translating motion thereto so as to pull the feedstock along the feed track and thereby advance the feedstock to a staging position as shown and described hereinabove with respect to FIG. 2.

At the staging position, the feedstock is cut by a cutting blade 42 that is reciprocally actuated by an air cylinder 43. Cutting blade severs the feedstock to form a textile extension having a predetermined length. A free end of the feedstock is thereafter turned upward away from the feed track by a reciprocating thruster 35 having a pair of push-up members 30 and 46 in a goal post-type configuration. Members 30 and 46 are supported upright by a spring block 39 positioned adjacent a spacer bar 41. One end of the feedstock may be upwardly lifted prior to the other end, or both ends may be lifted simultaneously depending upon the desired application of adhesive.

Opposing ends of the feedstock are thereafter rolled over by a pair of opposed roll-over tools 50 and 52, each of which is supported on a mounting bar and actuated by a thruster 53 so as to effect linear displacement. Roll-over tools 50 and 52 are thereby actuated so as to capture the feedstock in a curvature thereof and thereby form a loop 70 as shown in FIG. 7.

An actuating adhesive dispenser 34 retaining a quantity of adhesive therein is thereafter slidingly reciprocated toward loop 70 so as to dispense a predetermined amount of adhesive to either or both of the ends of the feedstock. The free ends of the feedstock are thereafter brought together so as to be adheringly secured to one another, thereby forming a butt joint 60 (shown in FIG. 5) on loop 70.

Referring back to FIG. 6, after forming butt joint 60 and ensuring proper overlap of fibers thereat, a cold forming operation is performed in which a cold clamp block 63 is utilized. Cold clamp block 63 typically utilizes a pair of clamps, jaws or similar apparatus to compress the butt joint and strengthen the joint thereby. Similarly, the joint is thereafter subjected to a hot forming process as described hereinabove during which a gripper 65 including a set of clamps or jaws 67 grasps joint 60 therebetween and applies heat thereto supplied by a heater 69.

An illustrative sequence of the present inventive process and the requisite time for its completion using a hair assembly apparatus of the present invention is provided below. It is emphasized that the times provided herein are merely an example of the efficiency with which the present process can be completed, and that these times can be affected by the selection of materials and adhesive as described thoroughly hereinabove. It is therefore understand that any or all steps may be modified in sequence or duration to adapt to different types of feedstock.

Example of Requisite Time to Perform Steps in Process for Manufacturing Elastic Hair Fasteners Using a Hair Fastener Assembly Apparatus

| Sequence: | Time |
| --- | --- |
| Feed and cut to length | 0.5 |
| Form loop | 1.0 |
| Dispense adhesive | 1.0 |
| Join ends | 0.5 |
| Cold form | 5.0 |
| Hot form | 1.0 |
| Unload | 0.5 |
| Total | 9.5 seconds |

The apparatus of the present invention, in performing the inventive process, is capable of taking braided stock from a box, feeding it, cutting it to length, bonding it and unloading a finished looped hair fastener into an outfeed chute for storage. Adhesive may be supplied to one or both ends of the braidstock extension, but is desirably only supplied to one side so as to avoid problems associated with excess adhesive.

The present invention provides a more aesthetically pleasing hair elastic that substantially eliminates the possibility for damaging or pulling hair. The hair loop assembly machine of the present invention also eliminates the need for any manual operation, which results in more consistently assembled and higher quality parts. This approach allows for the process to be automated, thereby achieving low cost production while enhancing the performance and appearance of the completed product.

Various changes to the foregoing described and shown methods and corresponding structures would now be evident to those skilled in the art. Accordingly, the particularly is closed scope of the invention is set forth in the following claims.

What is claimed is:

1. An improved method of adhesively assembling at least one elastic hair fastener, comprising the steps of:

a.) providing a quantity of textile feedstock;

b.) loading said feedstock into an adhesive assembly apparatus, said adhesive assembly apparatus comprising:

i.) at least one feed track for guiding said feedstock from an initial loading position to a subsequent staging position, wherein in said staging position, said feedstock overlays said feed track such that a face defined at a first free end of said feedstock lies adjacent a stop, said stop protruding normally from a planar surface of said feed track;

ii.) at least a first reciprocating member that imparts motion to said first free end such that said face lies substantially within a plane normal to the plane in which said face was positioned in said staging position;

iii.) a reciprocating adhesive dispenser having a chamber for retention of a flowable adhesive therein and an adhesive applicator depending therefrom which regulates the flow of said adhesive therethrough and thereby releases the adhesive in a predetermined desired quantity onto a substrate;

iv.) a reciprocating platen having generally rounded edges therearound so as to angularly urge said feedstock thereabout and initiate formation of the fastener loop, said platen being in parallel alignment with said feed track so as to sandwich said feedstock therebetween and maintain tension of said feedstock;

v.) a reciprocating cutter element supporting a cutting blade thereupon wherein said cutting element disposes said blade through an aperture in said feed track, said aperture being located at a predetermined position so that said blade cuts said feedstock to form a feedstock extension thereby having a second free end which defines a predetermined length;

vi.) at least a second reciprocating member actuated so as to impart movement to said second end such that a face defined thereat faces said dispenser;

vii.) a first reciprocating roll over tool including a curvature on a bottom interior surface thereof which corresponds to said rounded edge of said platen; and viii.) a second reciprocating roll over tool including a curvature defined on a bottom interior surface thereof which corresponds to said rounded edge of said platen, such that said second roll over tool slides toward said platen so as to sandwich said second free end therebetween and complete the formation of a loop thereby;

c.) cutting said feedstock to form said feedstock extension;

d.) dispensing said adhesive on at least one of said free ends;

e.) bringing said free ends adjacent one another so as to adheringly secure said free ends to one another and form a joint thereat;

f.) performing a cold forming operation on said joint to fixture said free ends and strengthen said joint thereby; and g.) performing a hot forming operation on said joint to improve said joint's aesthetic appearance.

2. The adhesive assembly method of claim 1 wherein a duration of said cold forming step ranges from about 3 to about 6 seconds.

3. The adhesive assembly method of claim 1 wherein said hot forming step is performed at a temperature at or between about 250° F. to about 400° F.

4. The adhesive assembly method of claim 3 wherein a duration of said hot forming step ranges from about 1 to about 3 seconds.

5. The adhesive assembly method of claim 1 wherein said feedstock includes an elastomeric core having a circumferential sheath of polymeric fibers disposed therearound.

6. The adhesive assembly method of claim 5 wherein said polymeric fibers are selected from the group of materials consisting of polypropylene and nylon.

7. The adhesive assembly method of claim 1 wherein said adhesive is selected from the group of adhesives consisting of cyanoacrylates.

8. The adhesive assembly method of claim 1 wherein each of said dispenser, said reciprocating members, said cutting tool and said roll over tools is pneumatically actuated.

9. The adhesive assembly method of claim 1 wherein each of said dispenser, said reciprocating members, said cutting tool and said roll over tools is controlled by any one of a programmable logic controller, PC based controller or other means of executing machine logic.

10. An apparatus for manufacturing at least one elastic hair fastener assembly having an adhesively secured joint thereon, said apparatus comprising:

a.) at least one feed track for guiding a quantity of textile feedstock from an initial loading position to a subsequent staging position, wherein in said staging position, said feedstock overlays said feed track such that a face defined at a first free end of said feedstock lies adjacent a stop, said stop protruding normally from a planar surface of said feed track;

b.) at least a first vertically reciprocating member that imparts motion to said first free end such that said face lies substantially within a plane normal to the plane in which said face was positioned in said staging position;

c.) a vertically reciprocating adhesive dispenser having a chamber for retention of a flowable adhesive therein and an adhesive applicator depending therefrom which regulates the flow of said adhesive therethrough and thereby releases the adhesive in a predetermined desired quantity onto a substrate;

d.) a vertically reciprocating platen having generally rounded edges therearound so as to angularly urge said feedstock thereabout and initiate formation of the fastener loop, said platen being in parallel alignment with said feed track so as to sandwich said feedstock therebetween and maintain tension of said feedstock;

e.) a vertically reciprocating cutter element supporting a cutting blade thereupon wherein said cutting element disposes said blade through an aperture in said feed track, said aperture being located at a predetermined position so that said blade cuts said feedstock to form a feedstock extension thereby having a second free end which defines a predetermined length;

f.) at least a second vertically reciprocating member actuated so as to impart movement to said second end such that a face defined thereat faces said dispenser;

g.) a first horizontally reciprocating roll over tool including a curvature on a bottom interior surface thereof which corresponds to said rounded edge of said platen; and h.) a second horizontally reciprocating roll over tool including a curvature defined on a bottom interior surface thereof which corresponds to said rounded edge of said platen, such that said second roll over tool slides toward said platen so as to sandwich said second free end therebetween and complete the formation of a loop thereby;

i.) at least one feed track for guiding said braidstock from an initial loading position to a subsequent staging position, wherein in said staging position, said braidstock overlays said feed track such that a face defined at a first free end of said braidstock lies adjacent a stop, said stop protruding normally from a planar surface of said feed track;

j.) a first vertically reciprocating member that imparts motion to said first free end such that said face lies within a plane normal to the plane in which said face was positioned in said staging position;

k.) a vertically reciprocating adhesive dispenser having a chamber for retention of a flowable adhesive therein and an adhesive applicator depending therefrom which regulates the flow of said adhesive therethrough and thereby releases the adhesive in a predetermined desired quantity onto a substrate;

l.) a vertically reciprocating platen having rounded edges therearound so as to create a curved portion in said braidstock and thereby begin formation of the fastener loop, said platen being in parallel alignment with said feed track so as to sandwich said braidstock therebetween and maintain tension of said braidstock;

m.) a vertically reciprocating cutter element supporting a cutting blade thereupon wherein said cutting element disposes said blade through an aperture in said feed track, said aperture being located at a predetermined position so that said blade cuts said braidstock to form a braidstock extension thereby having a second free end which defines a predetermined length;

n.) a second reciprocating member actuated in a vertical reciprocating motion so as to impart movement to said second end such that a face defined thereat faces said dispenser;

o.) a first roll over tool having horizontal reciprocating motion and including a curvature on a bottom interior surface thereof which corresponds to said rounded edge of said platen p.) a second roll over tool having reciprocating horizontal vertical motion including a curvature defined on a bottom interior surface thereof which corresponds to said rounded edge of said platen, such that said second roll over tool slides toward said so as to sandwich said second free end therebetween and complete the formation of a loop thereby.

11. The apparatus of claim 10 further including a cold forming clamp integrated therewith.

12. The apparatus of claim 10 further including a hot forming clamp integrated therewith.

13. The apparatus of claim 10 wherein each of said dispenser, said reciprocating members, said cutting tool and said roll over tools is pneumatically actuated.

14. The apparatus of claim 10 wherein each of said dispenser, said reciprocating members, said cutting tool and said roll over tools is controlled by any one of a programmable logic controller, PC based controller or other means of executing machine logic.

15. An improved elastic hair fastener, formed by an adhesive assembly method comprising the steps of:

a.) providing a quantity of textile feedstock;

b.) loading said feedstock into an adhesive assembly apparatus, said adhesive assembly apparatus comprising:

i.) at least one feed track for guiding said feedstock from an initial loading position to a subsequent staging position, wherein in said staging position, said feedstock overlays said feed track such that a face defined at a first free end of said feedstock lies adjacent a stop, said stop protruding normally from a planar surface of said feed track;

ii.) at least a first reciprocating member that imparts motion to said first free end such that said face lies substantially within a plane normal to the plane in which said face was positioned in said staging position;

iii.) a reciprocating adhesive dispenser having a chamber for retention of a flowable adhesive therein and an adhesive applicator depending therefrom which regulates the flow of said adhesive therethrough and thereby releases the adhesive in a predetermined desired quantity onto a substrate;

iv.) a reciprocating platen having generally rounded edges thereabout so as to angularly urge said feedstock thereabout and initiate formation of the fastener loop, said platen being in parallel alignment with said feed track so as to sandwich said feedstock therebetween and maintain tension of said feedstock;

v.) a reciprocating cutter element supporting a cutting blade thereupon wherein said cutting element disposes said blade through an aperture in said feed track, said aperture being located at a predetermined position so that said blade cuts said feedstock to form a feedstock extension thereby having a second free end which defines a predetermined length;

vi.) at least a second reciprocating member actuated so as to impart movement to said second end such that a face defined thereat faces said dispenser;

vii.) a first reciprocating roll over tool including a curvature on a bottom interior surface thereof which corresponds to said rounded edge of said platen; and viii.) a second reciprocating roll over tool including a curvature defined on a bottom interior surface thereof which corresponds to said rounded edge of said platen, such that said second roll over tool slides toward said platen so as to sandwich said second free end therebetween and complete the formation of a loop thereby;

c.) cutting said feedstock to form said feedstock extension;

d.) dispensing said adhesive on at least one of said free ends;

e.) bringing said free ends adjacent one another so as to adheringly secure said free ends to one another and form a joint thereat;

f.) performing a cold forming operation on said joint to fixture said free ends and strengthen said joint thereby; and g.) performing a hot forming operation on said joint to improve said joint's aesthetic appearance.

16. The elastic hair fastener of claim 15 wherein a duration of said cold forming step ranges from about 3 to about 6 seconds.

17. The elastic hair fastener of claim 15 wherein said hot forming step is performed at a temperature at or between about 250° F. to about 400° F.

18. The elastic hair fastener of claim 17 wherein a duration of said hot forming step ranges from about 1 to about 3 seconds.

19. The elastic hair fastener of claim 15 wherein said feedstock includes an elastomeric core having a circumferential sheath of polymeric fibers disposed therearound.

20. The elastic hair fastener assembly of claim 19 wherein said polymeric fibers are selected from the group of materials consisting of polypropylene and nylon.

21. The elastic hair fastener of claim 15 wherein said adhesive is selected from the group of adhesives consisting of cyanoacrylates.

22. The elastic hair fastener of claim 15 wherein each of said dispenser, said reciprocating members, said cutting tool and said roll over tools is pneumatically actuated.

23. The elastic hair fastener of claim 15 wherein each of said dispenser, said reciprocating members, said cutting tool and said roll over tools is controlled by any one of a programmable logic controller, PC based controller or other means of executing machine logic.

24. An elastic hair fastener, comprising:

an extension of textile feedstock having a first free end and a second opposed free end defining a predetermined length of feedstock therebetween, wherein said free ends are adheringly secured to one another by a predetermined quantity of flowable adhesive in a cold formed joint wherein such adhesive is substantially evenly distributed thereat.

25. The elastic hair fastener of claim 24 wherein said feedstock includes an elastomeric core having a circumferential sheath of polymeric fibers disposed therearound.

26. The elastic hair fastener of claim 25 wherein said polymeric fibers are selected from the group of materials consisting of polypropylene and nylon.

27. The elastic hair fastener of claim 24 wherein said adhesive at said joint is relatively soft.

28. The elastic hair fastener of claim 24 wherein said adhesive is selected from the group of adhesives consisting of cyanoacrylates.

* * * * *

UNITED STATES PATENT AND TRADEMARK OFFICE
CERTIFICATE OF CORRECTION

PATENT NO. : 6,516,853 B1
DATED : February 11, 2003
INVENTOR(S) : Gabrielson et al.

It is certified that error appears in the above-identified patent and that said Letters Patent is hereby corrected as shown below:

Column 4,
Line 48, reads "...outermost yams." should read -- ...outermost yarns. --.
Line 52, reads "...stress and yams that..." should read -- ...stress and yarns that... --.

Column 6,
Line 5, reads "...Theological properties, which..." should read -- rheological properties, which... --.

Signed and Sealed this

Eleventh Day of November, 2003

JAMES E. ROGAN
*Director of the United States Patent and Trademark Office*